(12) United States Patent
Hwang (10) Patent No.: US 7,121,303 B1
(45) Date of Patent: Oct. 17, 2006

(54) MIXED WATER FAUCET

(76) Inventor: Ren-Yih Hwang, 667, Sec. 2, Lu Ho Rd., Liao-Tsuo Li, Lu-Kang Chen, Changhua Hsien (TW)

( * ) Notice: Subject to any disclaimer, the term of this patent is extended or adjusted under 35 U.S.C. 154(b) by 172 days.

(21) Appl. No.: 10/909,903

(22) Filed: Aug. 2, 2004

(51) Int. Cl.
*F16K 11/085* (2006.01)

(52) U.S. Cl. ............... 137/625.41; 137/605; 137/801; 4/615; 4/676; 134/198; 239/112

(58) Field of Classification Search ............... 134/179, 134/198, 167 R; 137/625.41, 605, 801; 4/638, 4/676–678, 567, 570, 615; 239/24, 25, 106, 239/112, 113
See application file for complete search history.

(56) References Cited

U.S. PATENT DOCUMENTS

| | | | | |
|---|---|---|---|---|
| 167,817 A | * | 9/1875 | Bailey | ............ 4/570 |
| 380,039 A | * | 3/1888 | Johnson | ........ 239/282 |
| 1,023,630 A | * | 4/1912 | Elkins | ............ 134/44 |
| 2,757,687 A | * | 8/1956 | Moen | ........ 137/625.41 |
| 3,810,602 A | * | 5/1974 | Parkinson | ........ 251/304 |
| 4,565,218 A | * | 1/1986 | Yang | ........ 137/625.41 |
| 4,641,685 A | * | 2/1987 | Rudelick | ........ 137/625.31 |
| 4,981,156 A | * | 1/1991 | Nicklas et al. | ........ 137/270 |
| 5,535,943 A | * | 7/1996 | Kahle et al. | ........ 236/12.2 |
| 5,657,791 A | * | 8/1997 | Graber | ........ 137/625.41 |
| 6,301,727 B1 | * | 10/2001 | Bertrand et al. | ........ 4/678 |
| 6,355,009 B1 | * | 3/2002 | Henkin et al. | ........ 601/155 |
| 2003/0196712 A1 | * | 10/2003 | Graber | ........ 137/625.41 |

FOREIGN PATENT DOCUMENTS

GB          2109226 A1 * 11/1982

\* cited by examiner

*Primary Examiner*—Eric Keasel
*Assistant Examiner*—Craig Price
(74) *Attorney, Agent, or Firm*—Alan D. Kamrath; Nikolai & Mersereau, P.A.

(57) ABSTRACT

A mixed water faucet includes a valve seat, a control valve, a flow control member, a handle, and a nozzle. Thus, the mixed water faucet has a simplified construction, thereby decreasing costs of fabrication. In addition, the mixed water is controlled exactly by operation of the handle, thereby facilitating a user controlling the water temperature. Further, the mixed water faucet has a self-flush function by provision of the self-flush handle.

17 Claims, 9 Drawing Sheets

MIXED WATER FAUCET

BACKGROUND OF THE INVENTION

1. Field of the Invention

The present invention relates to a mixed water faucet, and more particularly to a mixed water faucet that has a simplified construction, thereby decreasing costs of fabrication.

2. Description of the Related Art

A conventional mixed water faucet mixes the cold water from the cold water pipe and the hot water from the hot water pipe, so that the mixed water flowing outward from the mixed water faucet has a proper temperature. However, the conventional mixed water faucet has a complicated construction, thereby increasing costs of fabrication. In addition, the mixed water cannot be controlled exactly by operation of the handle, thereby causing inconvenience to a user to control the water temperature. Further, the conventional mixed water faucet does not have a self-flush function.

SUMMARY OF THE INVENTION

In accordance with the present invention, there is provided a mixed water faucet, comprising a valve seat, a control valve, a flow control member, wherein:

the valve seat has an inside formed with a valve chamber having an end formed with a cold water inlet and a hot water inlet;

the control valve is rotatably mounted in the valve chamber of the valve seat and has an inside formed with a mixed water chamber having a first end formed with a water outlet and a second end formed with a receiving recess connected to the cold water inlet and the hot water inlet of the valve seat; and the flow control member is mounted in the receiving recess of the control valve to rotate with the control valve eccentrically and has an inside formed with a conducting hole communicating with the mixed water chamber of the control valve.

The primary objective of the present invention is to provide a mixed water faucet that has a simplified construction, thereby decreasing costs of fabrication.

Another objective of the present invention is to provide a mixed water faucet that has a simplified construction, so that the mixed water faucet is assembled easily and conveniently.

A further objective of the present invention is to provide a mixed water faucet, wherein the mixed water is controlled exactly by operation of the handle, thereby facilitating a user controlling the water temperature.

A further objective of the present invention is to provide a mixed water faucet, wherein the mixed water faucet has a self-flush function by provision of the self-flush handle.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–5, a mixed water faucet in accordance with the preferred embodiment of the present invention comprises a valve seat 10, a control valve 20, a flow control member 30, a handle 40, and a nozzle 50.

The valve seat 10 has an inside formed with a valve chamber 13 having an end formed with a cold water inlet 110 and a hot water inlet 120. The valve seat 10 has a peripheral wall formed with a substantially arc-shaped guide slot 15 communicating with the valve chamber 13 and a side water outlet 14 communicating with the valve chamber 13. The valve seat 10 has an end provided with a cold water pipe 11 connected to the cold water inlet 110 and a hot water pipe 12 connected to the hot water inlet 120.

Figure 2:
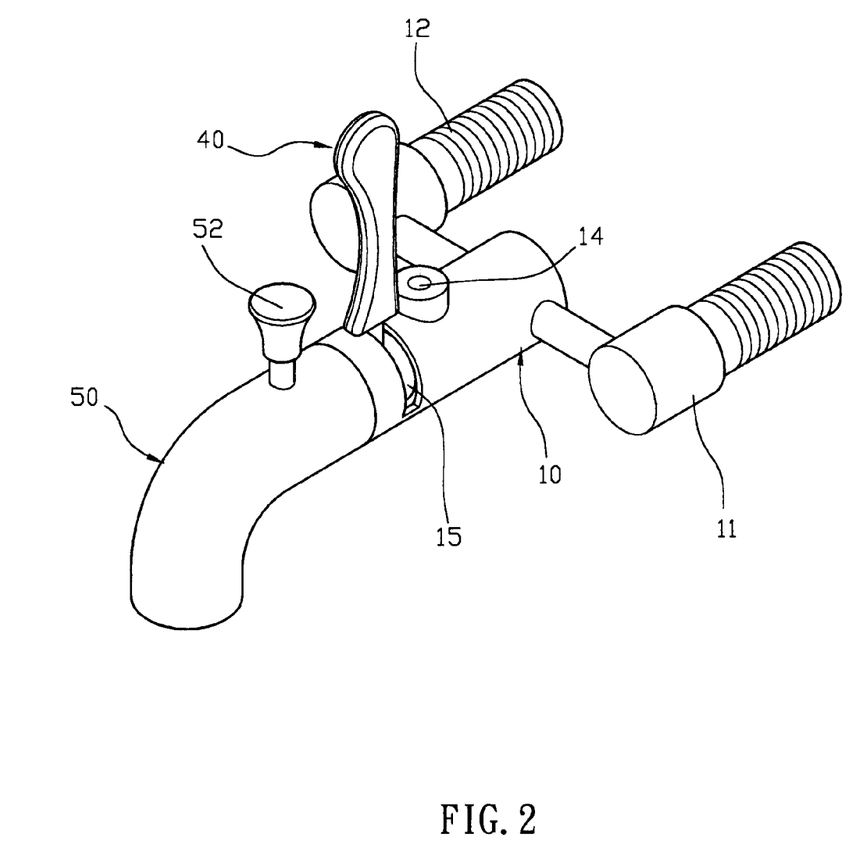
FIG. 2 is an exploded perspective view of the mixed water faucet as shown in FIG. 1.
Figure 3:
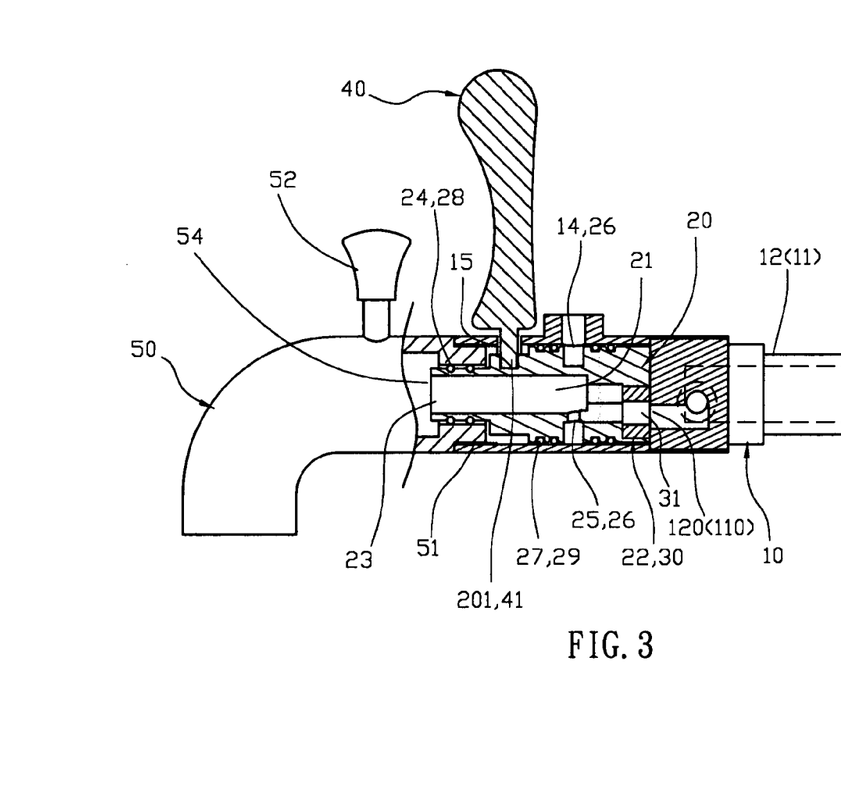
FIG. 3 is a partially plan cross-sectional view of the mixed water faucet as shown in FIG. 1.
Figure 4:
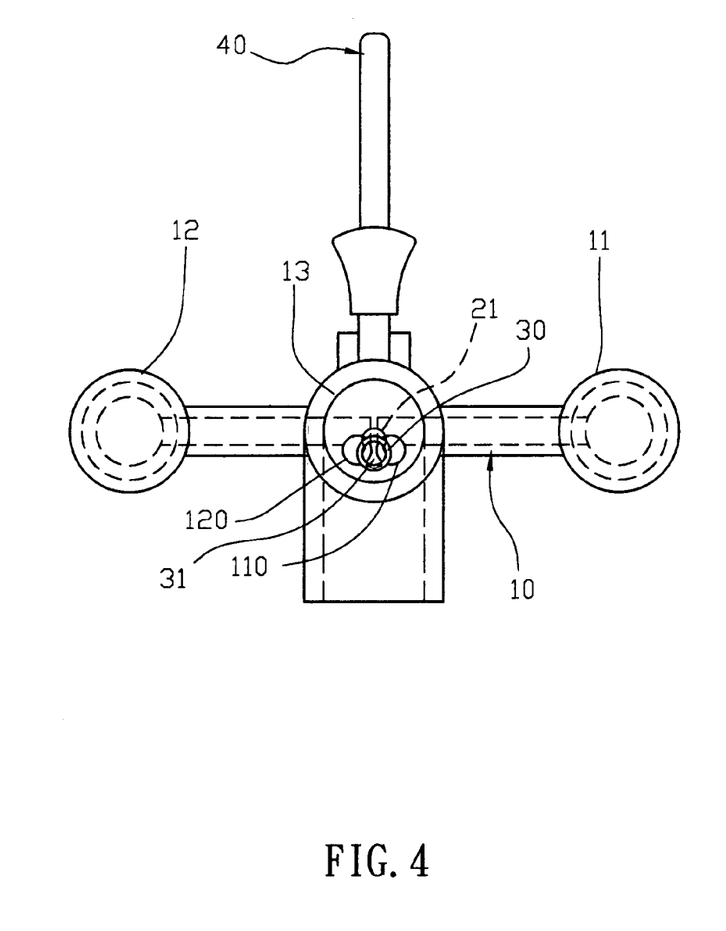
FIG. 4 is a side plan cross-sectional view of the mixed water faucet as shown in FIG. 1.

The control valve 20 is rotatably mounted in the valve chamber 13 of the valve seat 10 and has an inside formed with a mixed water chamber 21 having a first end formed with a water outlet 23 and a second end formed with a receiving recess 22 connected to the cold water inlet 110 and the hot water inlet 120 of the valve seat 10. The receiving recess 22 of the control valve 20 is located in the control valve 20 eccentrically. The control valve 20 has a peripheral wall formed with an annular conducting groove 26 communicating with the side water outlet 14 of the valve seat 10, and the mixed water chamber 21 of the control valve 20 has a side formed with a side water outlet 25 communicating with the conducting groove 26. The peripheral wall of the control valve 20 is formed with a screw bore 201. The peripheral wall of the control valve 20 is formed with a plurality of annular retaining grooves 27 for mounting a plurality of O-rings 29 urged on a wall of the valve chamber 13 of the valve seat 10.

The flow control member 30 is mounted in the receiving recess 22 of the control valve 20 to rotate with the control valve 20 eccentrically and has an inside formed with a conducting hole 31 communicating with the mixed water chamber 21 of the control valve 20. Preferably, the flow control member 30 is made of rubber material having a sealing effect.

Figure 5:
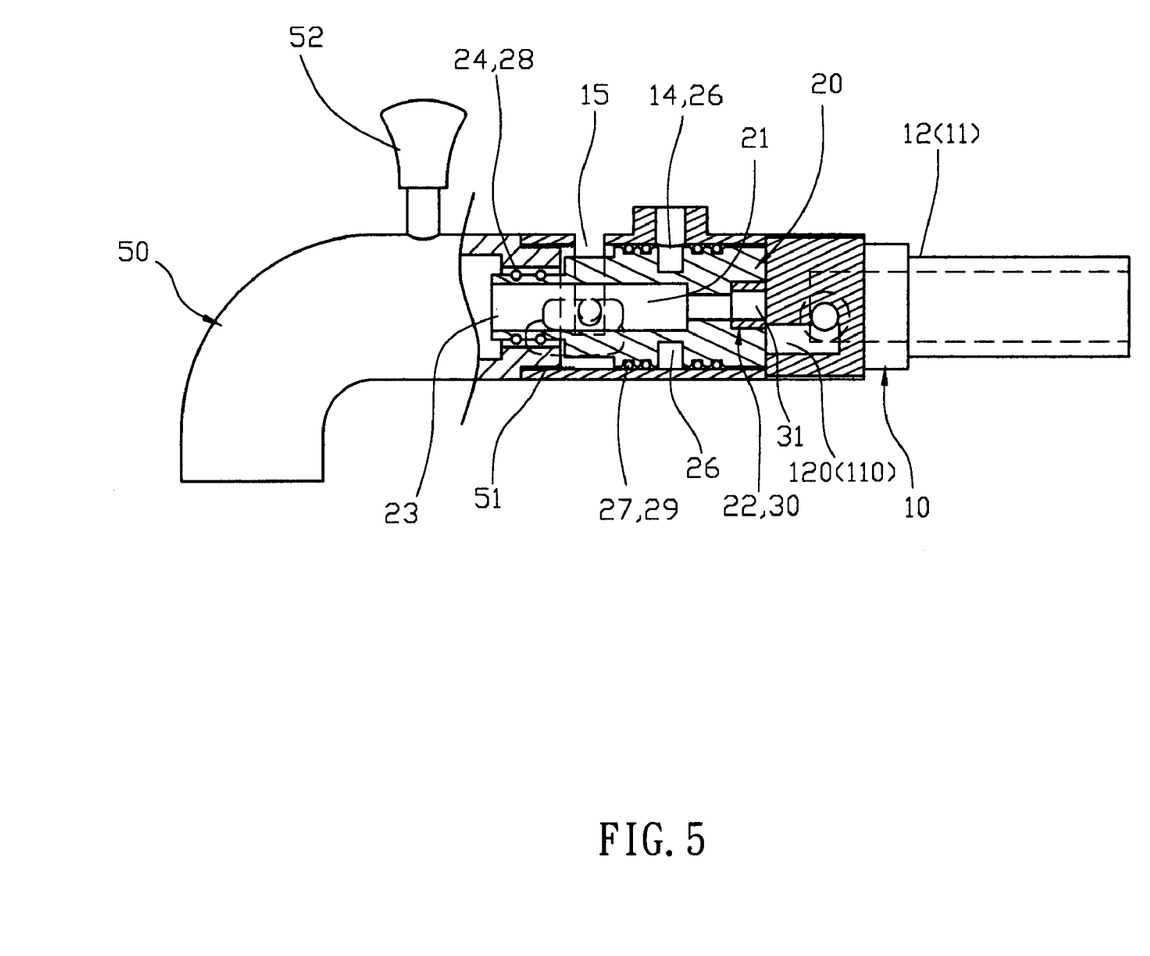
FIG. 5 is a schematic operational view of the mixed water faucet as shown in FIG. 3.

In practice, the control valve 20 is rotatable between a first position as shown in FIGS. 3 and 4 where the conducting hole 31 of the flow control member 30 aligns with either one or both of the cold water inlet 110 and the hot water inlet 120 of the valve seat 10, and a second position as shown in FIG. 5 where the control valve 20 aligns with and seals the cold water inlet 110 and the hot water inlet 120 of the valve seat 10 to interrupt a connection between the conducting hole 31 of the flow control member 30 and each of the cold water inlet 110 and the hot water inlet 120 of the valve seat 10.

Figure 1:
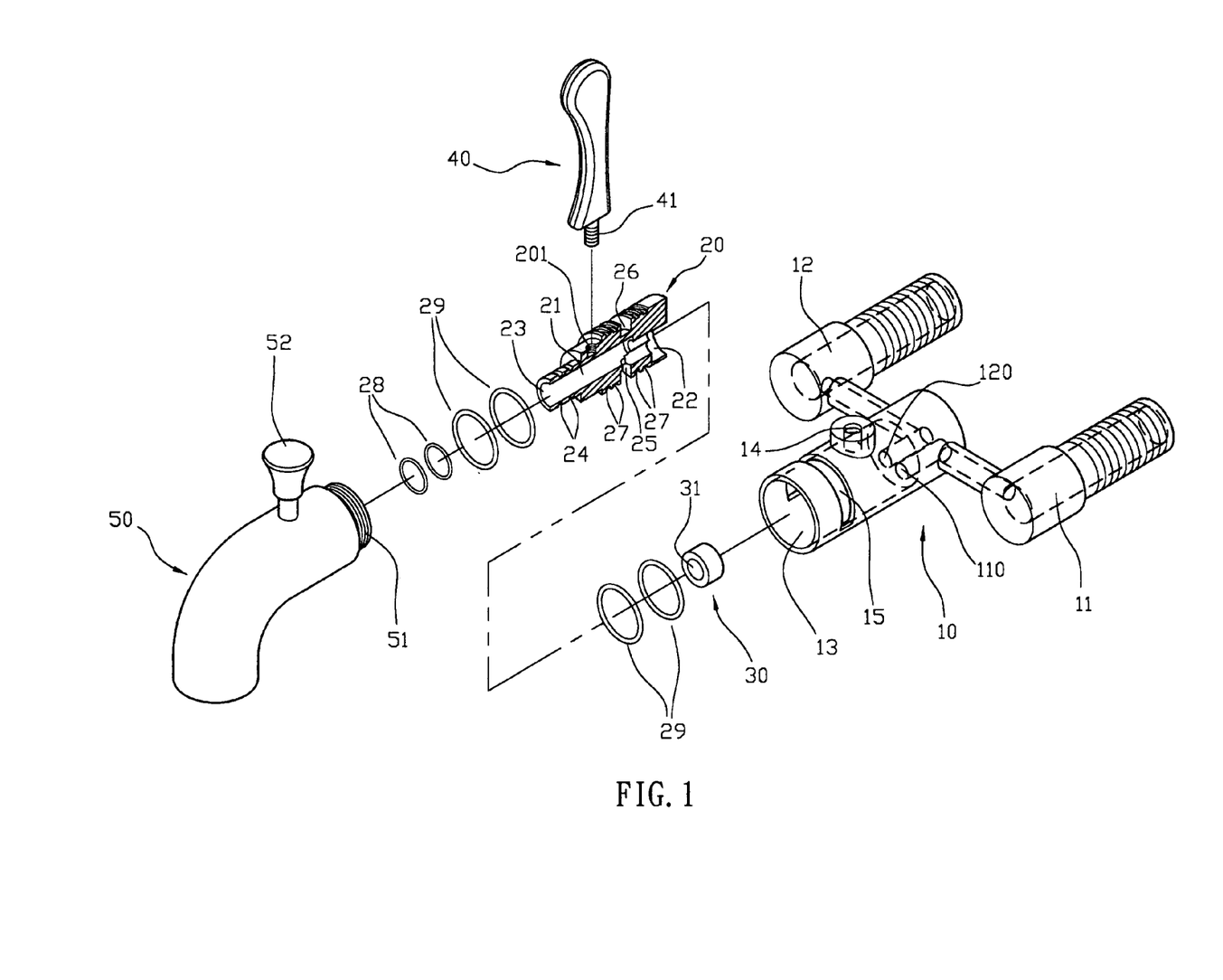
FIG. 1 is a perspective view of a mixed water faucet in accordance with the preferred embodiment of the present invention.

The handle 40 is pivotally mounted on the valve seat 10 and has a distal end extended through the guide slot 15 of the valve seat 10 and secured to the control valve 20 to rotate the valve seat 10. The distal end of the handle 40 is formed with an outer thread 41 screwed into the screw bore 201 of the control valve 20.

The nozzle 50 is mounted on the valve seat 10 and connected to the water outlet 23 of the control valve 20. The nozzle 50 has an end formed with a mounting portion 51 inserted into the valve chamber 13 of the valve seat 10 and mounted on a distal end of the control valve 20. The distal end of the control valve 20 has a peripheral wall formed with a plurality of annular retaining grooves 24 for mounting a plurality of O-rings 28 urged on the mounting portion 51 of the nozzle 50. A control lever 52 is movably mounted on the nozzle 50 and connected to an inside flow channel 54 (see FIG. 3) of the nozzle 50 to open or close the inside flow channel 54 of the nozzle 50.

In operation, when the control valve 20 is rotated by the handle 40 to move to the position as shown in FIGS. 3 and 4, the conducting hole 31 of the flow control member 30 aligns with both of the cold water inlet 110 and the hot water inlet 120 of the valve seat 10, so that the cold water from the cold water pipe 11 and the cold water inlet 110 and the hot water from the hot water pipe 12 and the hot water inlet 120 are introduced through the conducting hole 31 of the flow control member 30 and are mixed in the mixed water chamber 21 of the control valve 20. Then, the mixed water flows through the water outlet 23 of the control valve 20 into the nozzle 50 and finally flows outward from the nozzle 50.

In addition, when the conducting hole 31 of the flow control member 30 aligns with either of the cold water inlet 110 and the hot water inlet 120 of the valve seat 10, only the cold water from the cold water inlet 110 or the hot water from the hot water inlet 120 flows through the conducting hole 31 of the flow control member 30.

In addition, when the control lever 52 is pulled to close the inside flow channel 54 of the nozzle 50, the water outlet 23 of the control valve 20 is sealed. At this time, the water flows through the side water outlet 25 and the conducting groove 26 of the side water outlet 25 into the side water outlet 14 of the valve seat 10 and flows outward from the side water outlet 14 of the valve seat 10 for use with a hose (not shown) mounted on the side water outlet 14 of the valve seat 10. The hose is connected to a shower head (not shown) or the like.

Figure 3A:
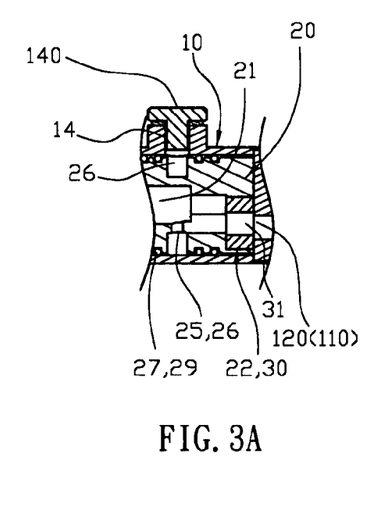
FIG. 3A is a cross-sectional view of the mixed water faucet as shown in FIG. 3.

As shown in FIG. 3A, a plug 140 is inserted into the side water outlet 14 of the valve seat 10 when the side water outlet 14 of the valve seat 10 is not in use.

Alternatively, when the control valve 20 is rotated by the handle 40 to move to the position as shown in FIG. 5, the control valve 20 aligns with and seals the cold water inlet 110 and the hot water inlet 120 of the valve seat 10 to interrupt a connection between the conducting hole 31 of the flow control member 30 and each of the cold water inlet 110 and the hot water inlet 120 of the valve seat 10, thereby stopping the water flow.

Referring to FIGS. 6–9, in accordance with another embodiment of the present invention, the mixed water faucet comprises a self-flush handle 40A pivotally mounted on the valve seat 10 and having a distal end 41A (see FIG. 7) extended through the guide slot 15 of the valve seat 10 and movably mounted on the control valve 20 to rotate the valve seat 10. The peripheral wall of the control valve 20 is formed with a through hole 201A (see FIG. 8), and the distal end 41A of the self-flush handle 40A is movably mounted in the through hole 201A of the control valve 20. The self-flush handle 40A has an inside formed with a flow channel 46A and a periphery formed with a plurality of water outlet holes 43A each connected to the flow channel 46A. The distal end 41A of the self-flush handle 40A is formed with a water inlet hole 42A connected to the flow channel 46A. The distal end 41A of the self-flush handle 40A is provided with a plurality of O-rings 44A (see FIG. 7).

Figure 6:
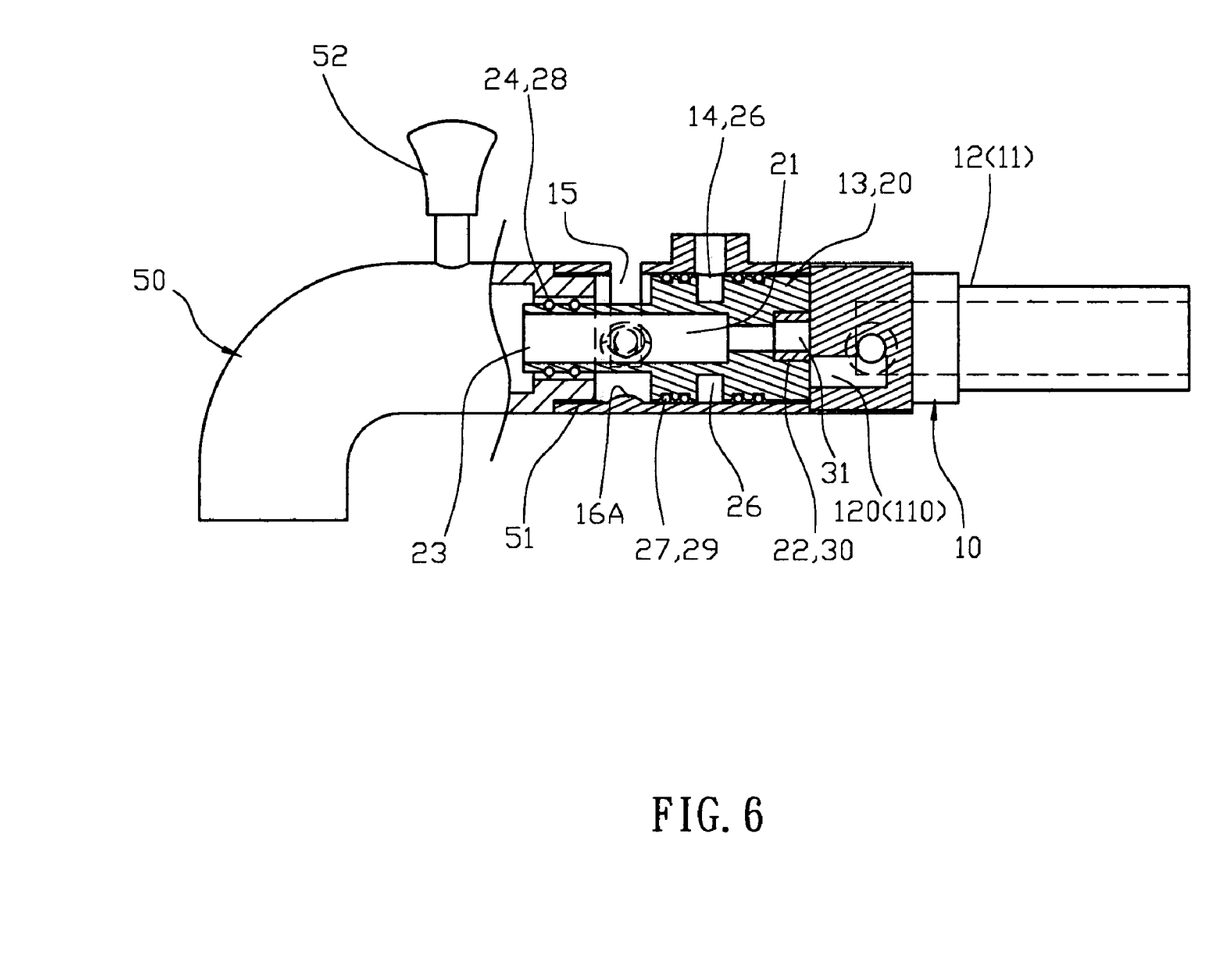
FIG. 6 is a partially plan cross-sectional view of a mixed water faucet in accordance with another embodiment of the present invention.
Figure 7:
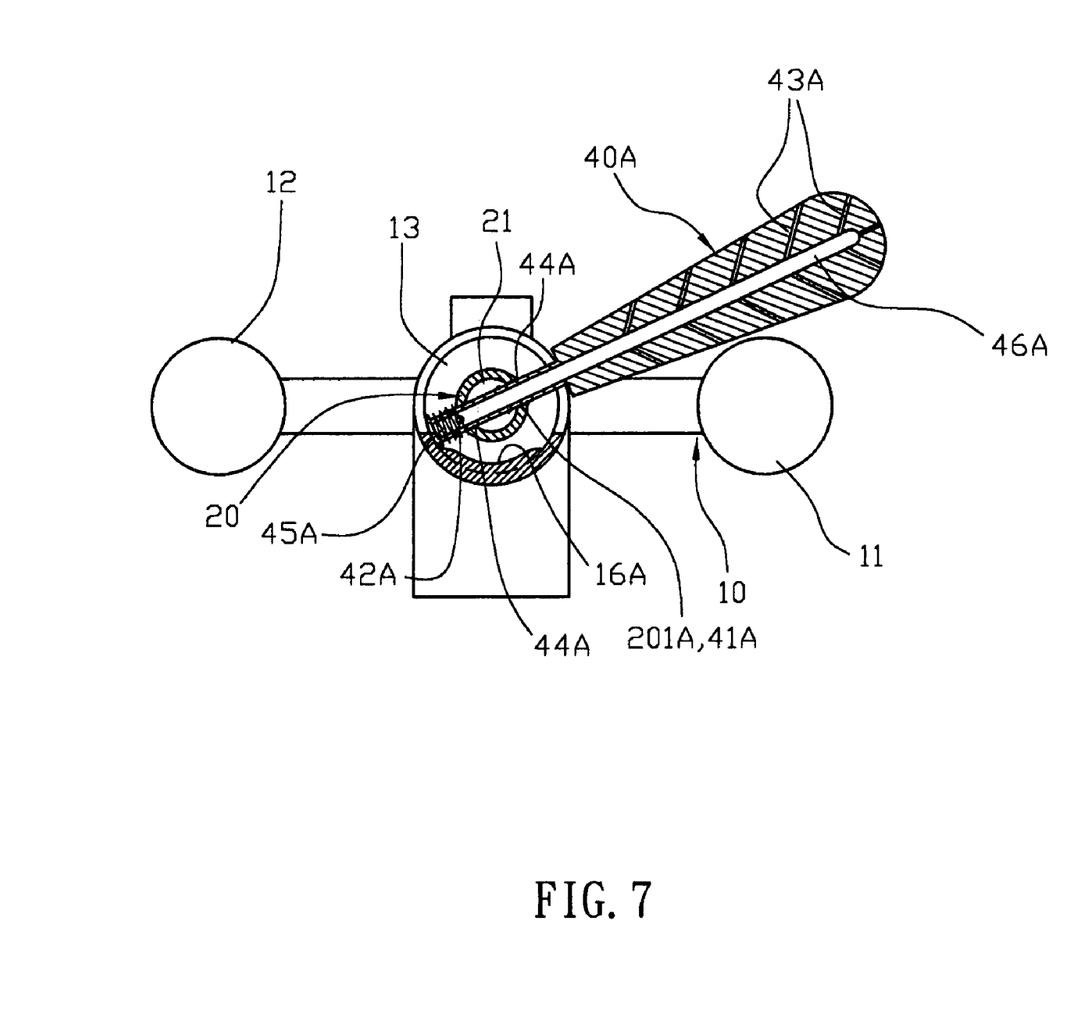
FIG. 7 is a side plan cross-sectional view of the mixed water faucet in accordance with another embodiment of the present invention.
Figure 8:
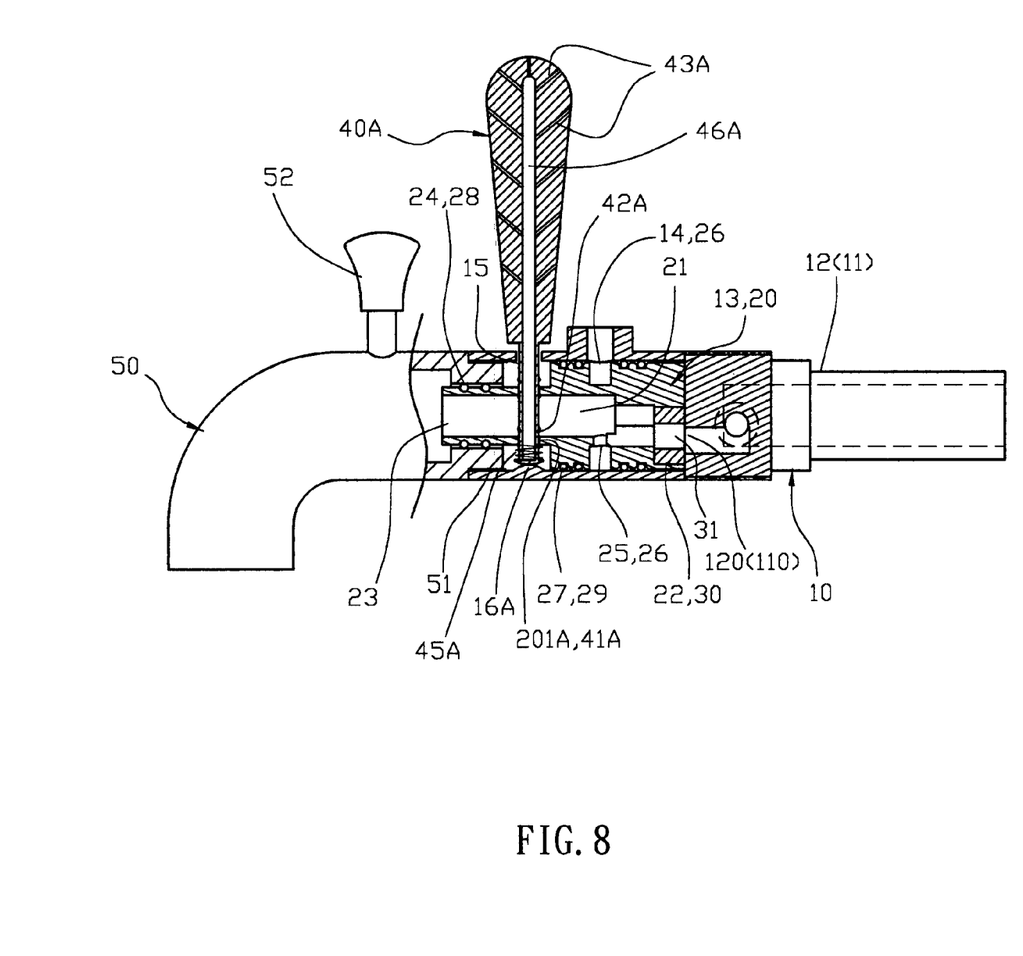
FIG. 8 is a schematic operational view of the mixed water faucet as shown in FIG. 6.
Figure 9:
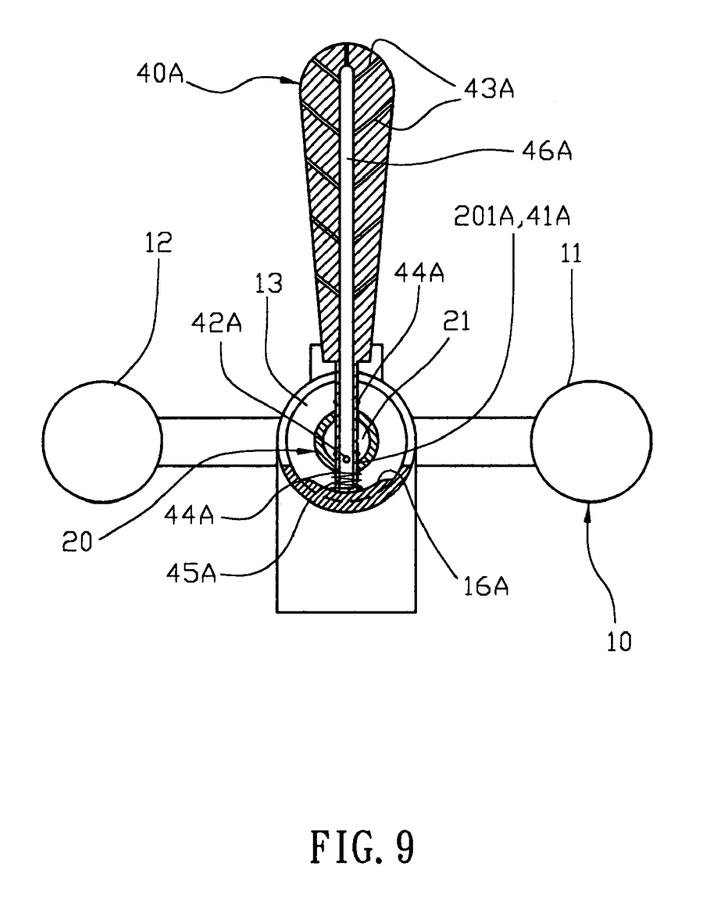
FIG. 9 is a schematic operational view of the mixed water faucet as shown in FIG. 7.

In practice, the self-flush handle 40A is movable between a first position as shown in FIGS. 8 and 9 where the water inlet hole 42A of the self-flush handle 40A is located in and communicated with the mixed water chamber 21 of the control valve 20, and a second position as shown in FIGS. 6 and 7 where the water inlet hole 42A of the self-flush handle 40A is located outside of the mixed water chamber 21 of the control valve 20 to interrupt a connection between the water inlet hole 42A of the self-flush handle 40A and the mixed water chamber 21 of the control valve 20.

The valve chamber 13 of the valve seat 10 is formed with a protruding urging portion 16A. A restoring spring 45A is mounted on the distal end 41A of the self-flush handle 40A and has a first end secured on the distal end 41A of the self-flush handle 40A and a second end urged on the control valve 20 to push the distal end 41A of the self-flush handle 40A to move outward relative to the control valve 20.

In practice, when the self-flush handle 40A is movable to the first position as shown in FIGS. 8 and 9, the distal end 41A of the self-flush handle 40A is urged by the urging portion 16A of the valve seat 10 to move toward to the control valve 20, so that the water inlet hole 42A of the self-flush handle 40A is located in and communicated with the mixed water chamber 21 of the control valve 20. Thus, the water flowing through the mixed water chamber 21 of the control valve 20 flows through the water inlet hole 42A, the flow channel 46A and the water outlet holes 43A of the self-flush handle 40A and flows outward from the water outlet holes 43A of the self-flush handle 40A so as to flush the self-flush handle 40A.

Alternatively, when the self-flush handle 40A is movable to the second position as shown in FIGS. 6 and 7, the distal end 41A of the self-flush handle 40A is detached from the urging portion 16A of the valve seat 10 and is pushed by the restoring force of the restoring spring 45A to move outward relative to the control valve 20, so that the water inlet hole 42A of the self-flush handle 40A is located outside of the mixed water chamber 21 of the control valve 20 to interrupt the connection between the water inlet hole 42A of the self-flush handle 40A and the mixed water chamber 21 of the control valve 20, thereby stopping the water flowing through the self-flush handle 40A.

Accordingly, the mixed water faucet has a simplified construction, thereby decreasing costs of fabrication. In addition, the mixed water faucet has a simplified construction, so that the mixed water faucet is assembled easily and conveniently. Further, the mixed water is controlled exactly by operation of the handle 40, thereby facilitating a user controlling the water temperature. Further, the mixed water faucet has a self-flush function by provision of the self-flush handle 40A.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A mixed water faucet, comprising a valve seat, a control valve, and a flow control member, wherein:
   the valve seat has an inside formed with a valve chamber having an end formed with a cold water inlet and a hot water inlet;
   the control valve is rotatably mounted in the valve chamber of the valve seat and has an inside formed with a mixed water chamber having a first end formed with a water outlet and a second end formed with a receiving recess connected to the cold water inlet and the hot water inlet of the valve seat;
   the flow control member is mounted in the receiving recess of the control valve to rotate with the control valve eccentrically and has an inside formed with a conducting hole communicating with the mixed water chamber of the control valve;
   the valve seat has a peripheral wall formed with a substantially arc-shaped guide slot communicating with the valve chamber, and the mixed water faucet further comprises a self-flush handle pivotally mounted on the valve seat and having a distal end extended through the guide slot of the valve seat and movably mounted on the control valve to rotate the valve seat; and
   the control valve has a peripheral wall formed with a through hole, and the distal end of the self-flush handle is movably mounted in the through hole of the control valve.

2. The mixed water faucet in accordance with claim 1, wherein the control valve is rotatable between a first position where the conducting hole of the flow control member aligns with either one or both of the cold water inlet and the hot water inlet of the valve seat, and a second position where the control valve aligns with and seals the cold water inlet and the hot water inlet of the valve seat to interrupt a connection between the conducting hole of the flow control member and each of the cold water inlet and the hot water inlet of the valve seat.

3. The mixed water faucet in accordance with claim 1, wherein the valve seat has a peripheral wall formed with a substantially arc-shaped guide slot communicating with the valve chamber, and the mixed water faucet further comprises a handle pivotally mounted on the valve seat and having a distal end extended through the guide slot of the valve seat and secured to the control valve to rotate the valve seat.

4. The mixed water faucet in accordance with claim 3, wherein the valve seat has a peripheral wall formed with a screw bore, and the distal end of the handle is formed with an outer thread screwed into the screw bore of the control valve.

5. The mixed water faucet in accordance with claim 1, wherein the valve seat has a peripheral wall formed with and a side water outlet communicating with the valve chamber, the control valve has a peripheral wall formed with an annular conducting groove communicating with the side water outlet of the valve seat, and the mixed water chamber of the control valve has a side formed with a side water outlet communicating with the conducting groove.

6. The mixed water faucet in accordance with claim 5, further comprising a plug inserted into the side water outlet of the valve seat.

7. The mixed water faucet in accordance with claim 1, wherein the receiving recess of the control valve is located in the control valve eccentrically.

8. The mixed water faucet in accordance with claim 1, further comprising a nozzle mounted on the valve seat and connected to the water outlet of the control valve, wherein the nozzle has an end formed with a mounting portion inserted into the valve chamber of the valve seat and mounted on a distal end of the control valve.

9. The mixed water faucet in accordance with claim 8, wherein the distal end of the control valve has a peripheral wall formed with a plurality of annular retaining grooves for mounting a plurality of O-rings urged on the mounting portion of the nozzle.

10. The mixed water faucet in accordance with claim 8, further comprising a control lever movably mounted on the nozzle and connected to an inside flow channel of the nozzle to open or close the inside flow channel of the nozzle.

11. The mixed water faucet in accordance with claim 1, wherein the control valve has a peripheral wall formed with a plurality of annular retaining grooves for mounting a plurality of O-rings urged on a wall of the valve chamber of the valve seat.

12. The mixed water faucet in accordance with claim 1, wherein the flow control member is made of rubber material.

13. A mixed water faucet, comprising a valve seat, a control valve, and a flow control member, wherein:
   the valve seat has an inside formed with a valve chamber having an end formed with a cold water inlet and a hot water inlet;
   the control valve is rotatable mounted in the valve chamber of the valve seat and has an inside formed with a mixed water chamber having a first end formed with a water outlet and a second end formed with a receiving recess connected to the cold water inlet and the hot water inlet of the valve seat;
   the flow control member is mounted in the receiving recess of the control valve to rotate with the control valve eccentrically and has an inside formed with a conducting hole communicating with the mixed water chamber of the control valve;
   the valve seat has a peripheral wall formed with a substantially arc-shaped glide slot communicating with the valve chamber, and the mixed water faucet further comprises a self-flush handle pivotally mounted on the valve seat and having a distal end extended through the guide slot of the valve seat and movably mounted on the control valve to rotate the valve seat
   the self-flush handle has an inside formed with a flow channel and a periphery formed with a plurality of water outlet holes each connected to the flow channel, and the distal end of the self-flush handle is formed with a water inlet hole connected to the flow channel; and
   the self-flush handle is movable between a first position where the water inlet hole of the self-flush handle is located in and communicated with the mixed water chamber of the control valve, and a second position where the water inlet hole of the self-flush handle is located outside of the mixed water chamber of the control valve to interrupt a connection between the water inlet hole of the self-flush handle and the mixed water chamber of the control valve.

14. The mixed water faucet in accordance with claim 13, wherein the valve chamber of the valve seat is formed with a protruding urging portion, the mixed water faucet further comprises a restoring spring mounted on the distal end of the self-flush handle and having a first end secured on the distal end of the self-flush handle and a second end urged on the control valve to push the distal end of the self-flush handle to move outward relative to the control valve.

15. The mixed water faucet in accordance with claim 14, wherein when the self-flush handle is movable to the first position, the distal end of the self-flush handle is urged by the urging portion of the valve seat to move toward to the control valve, so that the water inlet hole of the self-flush handle is located in and communicated with the mixed water chamber of the control valve.

16. The mixed water faucet in accordance with claim 14, wherein when the self-flush handle is movable to the second position, the distal end of the self-flush handle is detached from the urging portion of the valve seat and is pushed by the restoring force of the restoring spring to move outward relative to the control valve, so that the water inlet hole of the self-flush handle is located outside of the mixed water chamber of the control valve.

17. A mixed water faucet, comprising a valve seat, a control valve, and a flow control member, wherein:

- the valve seat has an inside formed with a valve chamber having an end formed with a cold water inlet and a hot water inlet;
- the control valve is rotatable mounted in the valve chamber of the valve seat and has an inside formed with a mixed water chamber having a first end formed with a water outlet and a second end formed with a receiving recess connected to the cold water inlet and the hot water inlet of the valve seat;
- the flow control member is mounted in the receiving recess of the control valve to rotate with the control valve eccentrically and has an inside formed with a conducting hole communicating with the mixed water chamber of the control valve;
- the valve seat has a peripheral wall formed with a substantially arc-shaped guide slot communicating with the valve chamber, and the mixed water faucet further comprises a self-flush handle pivotally mounted on the valve seat and having a distal end extended through the guide slot of the valve seat and movably mounted on the control valve to rotate the valve seat; and
- the distal end of the self-flush handle is provided with a plurality of O-rings.

* * * * *